Figure 1:
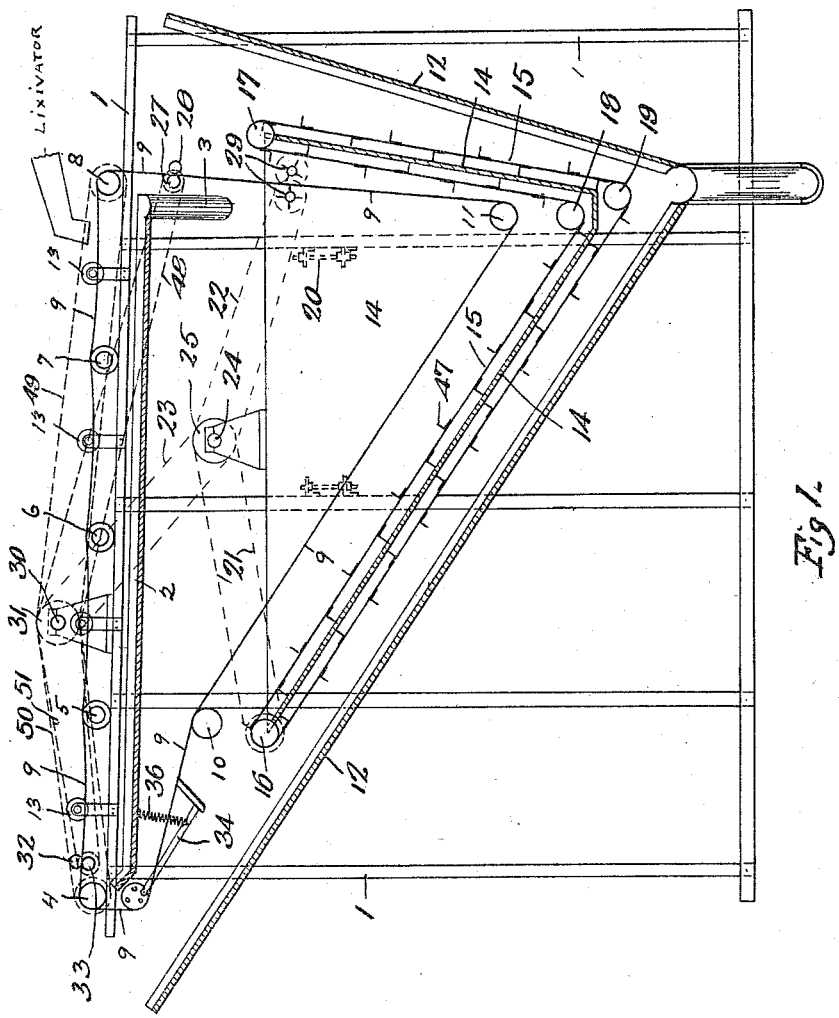

J. M. WITMER.
FILTER.
APPLICATION FILED MAY 5, 1916.

1,279,063.

Patented Sept. 17, 1918.
4 SHEETS—SHEET 1.

WITNESSES:
Edgar L. Long.
M. L. Lefevre.

INVENTOR
John M. Witmer.
BY
ATTORNEY.

J. M. WITMER.
FILTER.
APPLICATION FILED MAY 5, 1916.

1,279,063.

Patented Sept. 17, 1918.
4 SHEETS—SHEET 2.

WITNESSES:
Edgar L. Long
M. L. Lefevré

INVENTOR
John M. Witmer.
BY
ATTORNEY

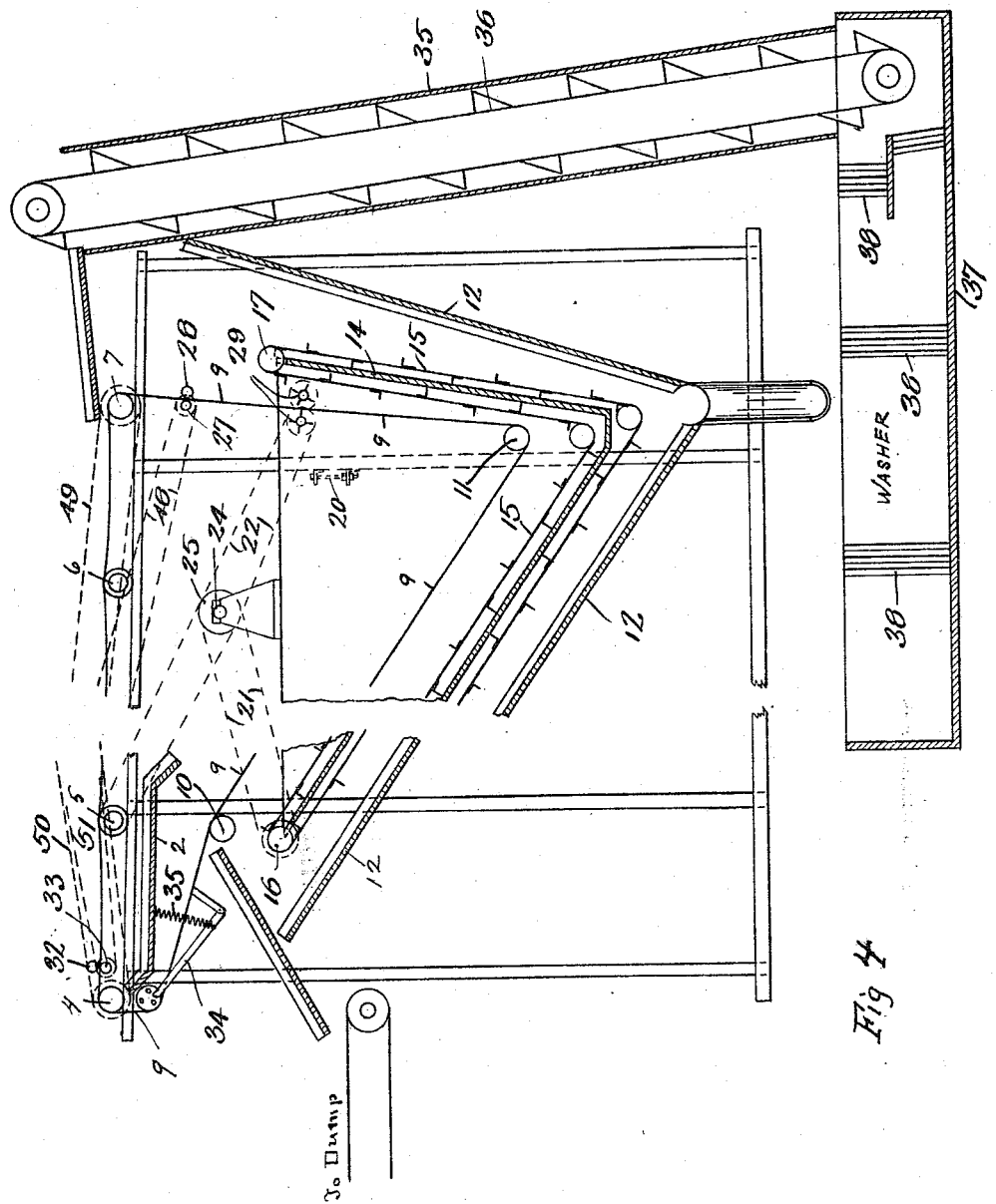

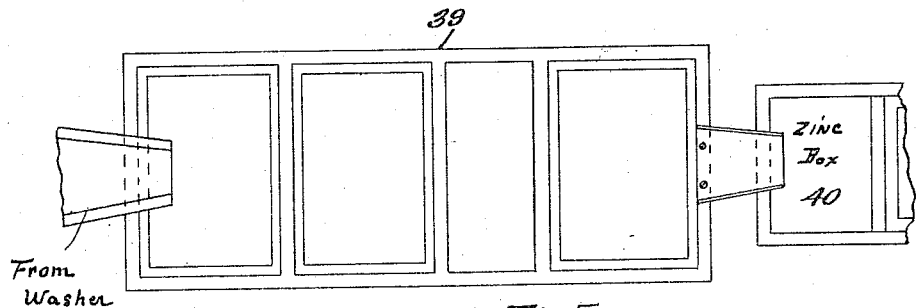
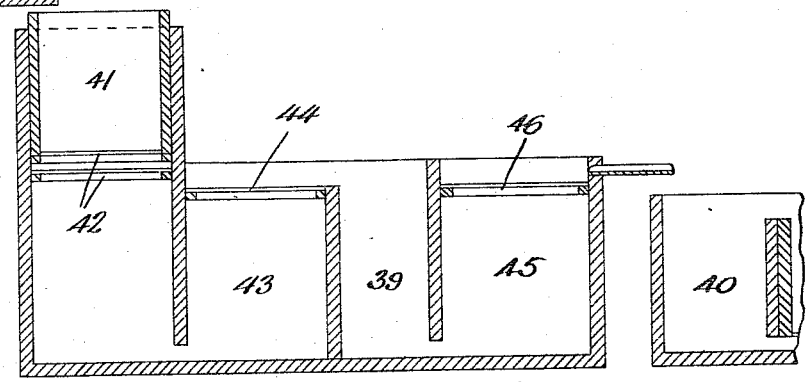
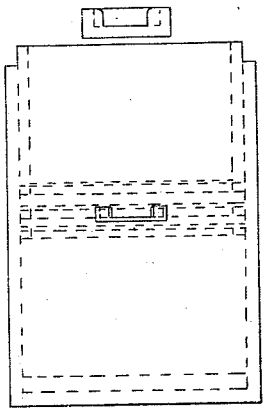

UNITED STATES PATENT OFFICE.

JOHN M. WITMER, OF LANCASTER, PENNSYLVANIA.

FILTER.

1,279,063.

Specification of Letters Patent.   Patented Sept. 17, 1918.

Application filed May 5, 1916. Serial No. 95,730.

*To all whom it may concern:*

Be it known that I, JOHN M. WITMER, a citizen of the United States, residing at Lancaster, in the county of Lancaster and State of Pennsylvania, have invented certain new and useful Improvements in Filters, of which the following is a specification, reference being had therein to the accompanying drawing.

This invention relates to a filter for use in the cyaniding of ores, but it may be employed for other purposes where it is desired to quickly and positively separate sand and slimes from solution and clarify the solution.

While it is my intention to employ a number of filters or units it is solely for the purpose of providing sufficient filtering surface for the requirements of the work to be done, and also for the purpose of being able to cut out a unit for repairs or cleaning.

The object of the invention is to provide a filter that shall be simple, durable, and efficient, contain few parts, which are readily removable, and be of such size that it shall have a large capacity, and yet be readily transported.

This invention is directed toward collecting the values from slimes and subsequently disposing of the tailings on the dump in a dry state.

One object of the invention is to produce a cheap, durable, and positive continuous filtering and clarifying machine, which saves time and labor, and that will have a filtering device that will allow the liquid to pass through the filtering material at the same speed as the unfiltered material is received. Another object of the invention is to produce a filter in which the filtering material is continuously cleaned and always presents a clean surface for filtering.

With these and other objects in view, my invention consists in certain construction and combination of parts as will hereinafter be fully described and claimed in the specification, and illustrated in the accompanying drawings, which form a part of this application, and in which like figures of reference refer to corresponding parts in all of the views; but it is fully understood that while I have here described my invention as shown that I do not confine myself to the exact design, as slight changes may be made in the construction and arrangement of the several parts without departing from the spirit of the invention.

In the drawings:—

Figure 1. is a side elevation of one of my filter units, shown partly in section.

Figure 2:
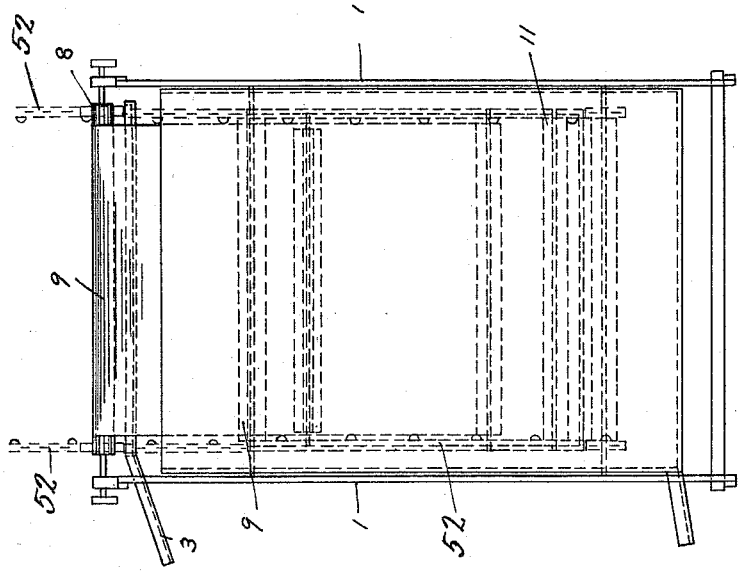

Fig. 2. is an elevation of the receiving end.

Figure 3:
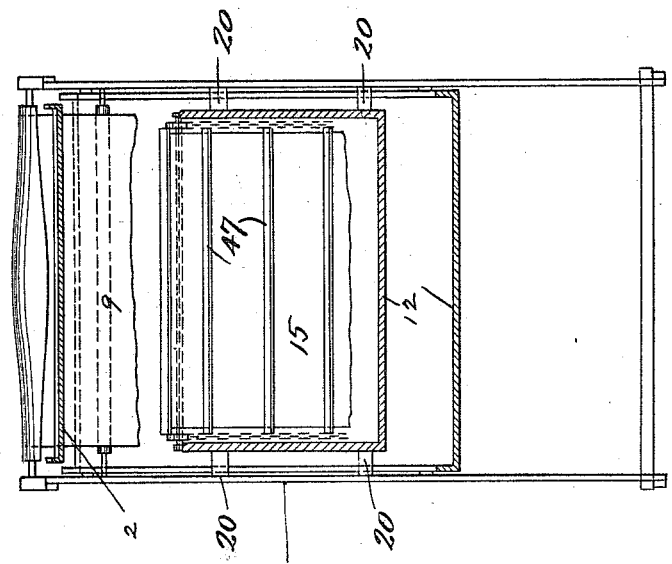

Fig. 3. is a partial transverse section.

Fig. 4. is a side elevation of the first and last units used in the series.

Figs. 5, 6, and 7 are views of the clarifiers.

Referring to the drawings:—

The unit as shown in Figs. 1 and 2, comprises a framework 1, of suitable design, in which are arranged a number of transverse shafts, on which are mounted rollers, over which are stretched endless bands of suitable filtering material, such as burlap, canvas, felt, silk, etc.; the idea being to first pass the material to be filtered through coarse material, then through finer, and so on, until the liquid is clear, and the filtering material is constantly kept in motion, and is continuously cleaned thus always presenting a clean surface through which the liquid will readily pass.

Near the upper part of the frame work 1, is placed an inclined trough or pan 2, having a spout 3, at its lower end to convey the liquid to the next unit. Above said pan 2, are the rollers 4, 5, 6, 7, and 8, which are slightly tapered toward their ends, operated by the belt 50 from the drive shaft 30, and on which runs the endless strip of filtering material 9, which passes over the straight roller 10, and under the roller 11, which is placed within and near the bottom of the tank 14. The edges of this endless belt of filtering material are secured to endless chains 52 (see Figs. 2 and 3), which pass over sprocket wheels secured on the ends of the roller shafts, the object of the tapered rollers being to support the belt higher in the center, so that the surplus liquid will quickly drain off the sides.

Suitable tighteners 13, are provided for the chains on the outside of the wash box which is L-shaped to raise or lower the same, thus tightening the belt and chains. The V-shaped tank 14 is mounted within a tank 12 which leads to the washer 37; said tank 14 is provided with an endless conveyer 15 which travels over the sprockets 16, 17, 18, and 19 and which has transverse angle plates 47 for conveying the sediment from the tank 14 to the tank 12. Said conveyer 15 is operated by a belt 21 from a sprocket 25 on the jack shaft 24 which in turn is rotated by a belt 23 from a sprocket 31 on the main drive shaft 30.

The tank 14 is raised or lowered in the tank 12 by the adjusting bolts 20, by which it is mounted.

The filtering material 9, is run between a pair of rollers 32 and 33 (operated by the belt 51) which wring the liquid out and dry the belt 9, and it then passes over a beater 34, operated by a spring 26, and after passing through the washer 14 it passes between the paddles 29 (which are operated by the belt 22 from the shaft 24) and then through a wringer 27 and 28 operated by a belt 48 from the shaft 30.

The washer 37 is a box divided into compartments by felts 38 and the liquid after passing through said felts is elevated by the trough 35 and elevator 36, and delivered upon the belt 9 of the next filtering unit.

The clarifier comprises a box 39 divided into compartments 41, 43, and 45; the compartment 41 containing sand and the tops of the compartments 43 and 45 being covered with felts 44 and 46.

From here the liquid passes into the zinc box 40.

In the present filters for this purpose the finely pulverized ore or slimes lie in such a dense and close mass that when it accumulates to the depth of only a few inches, no liquid can pass through it, and it will therefore be seen that by my construction of a traveling washed belt of filtering material, the ore and slimes are always received on a clean surface, and the belt is washed, and the belt and ore pass through wringers to squeeze out the liquid and discharge the ore and slime in a dry state.

The liquid drained through the belt goes to a receiving pan below the belt and flows down the incline to the receiving point, and is there carried by a trough to the second unit and so on from one unit to the next, and if any fine sediments are recovered they also pass to the washer and are treated as the first.

It will further be seen that the filtering material can be readily renewed or changed to suit different grades of ore without stopping the process by simply having an extra unit.

It will further be seen by my method of filtering and clarifying, that the sediment and tailings are collected in a much drier state, and the liquid is much clearer, and a higher percentage of values recovered, and in a short time.

The operation of the device is as follows:

The ore and solution is delivered onto the filtering belt 9, from the lixiviator; and the solution passes through said belt 9, onto the pan 2, and is carried by the spout 3, to the next unit; and as the belt 9 carrying the ore and slimes moves forward it passes through the wringer rolls 32, and down over the roller 10, where it is beaten by the beater 34, to knock off the ore and slime which drop into the trough 12, while the belt is carried down into the washing box 14, where it passes through wash water; is scraped by the wheels 29, and wrung out by the rollers 27, and 28, and again receives the ore, slimes and solution.

The washing box 14, is provided with an endless conveyer 15, which conveys any sediment out of the washer into the pan 12.

The entire apparatus is operated by suitable endless chains, and sprockets, by any suitable power.

While I am aware that endless belts of suitable material have been employed for filtering purposes, and devices employed for washing and drying said belt during its travel, I have found that in filtering slimes, that the belt becomes coated with the slime and thus prevents the liquid from passing through, and as the weight of the material to be filtered tends to depress the center of the belt into a trough, the liquid cannot pass through and the belt is thus rendered useless for filtering any material that tends to slime it. In my invention I have overcome this by the use of tapered rollers to support the belt. The weight of the material to be filtered will bag the belt between each roller, but as the belt is carried over the roller the center is raised, arching the belt and the liquid will flow toward the sides of the belt which are not coated, and thus the liquid can pass through the same and in this manner the material is more evenly distributed over the belt, and the operation of filtering greatly hastened

Having thus described my invention, what I claim as new and desire to secure by Letters Patent is:—

In a filter of the class described, in combination with an endless conveyer belt of filtering material, and means for causing said belt to travel through the casing of said filter, of a series of supporting rollers, said rollers being of larger diameter in the center and tapered toward their ends, for the purpose of arching said belt as it passes over said rollers to drain the liquid toward the edges thereof.

In testimony whereof I affix my signature in presence of two witnesses.

JOHN M. WITMER.

Witnesses:
JOHN J. THOMPSON,
I. C. ARNOLD.